(12) United States Patent
Martini et al.

(10) Patent No.: US 7,687,301 B2
(45) Date of Patent: Mar. 30, 2010

(54) INTEGRATED DEVICE MANUFACTURING PROCESS

(75) Inventors: Francesco Martini, Alzate Brianza (IT); Maurizio Lenzi, Novara (IT); Ubaldo Mastromatteo, Bareggio (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 21 days.

(21) Appl. No.: 12/015,271

(22) Filed: Jan. 16, 2008

(65) Prior Publication Data

US 2008/0213934 A1 Sep. 4, 2008

(30) Foreign Application Priority Data

Jan. 18, 2007 (IT) .................... MI2007A0060

(51) Int. Cl.
*H01L 21/00* (2006.01)
(52) U.S. Cl. ................. 438/57; 438/700; 257/E21.001; 257/E21.249
(58) Field of Classification Search .................... 438/57, 438/700; 257/E21.001, E21.249
See application file for complete search history.

(56) References Cited

U.S. PATENT DOCUMENTS

| 4,938,841 | A  | * | 7/1990 | Shahar et al. ............... 438/701 |
| 5,135,605 | A  |   | 8/1992 | Blonder et al. |
| 5,182,787 | A  | * | 1/1993 | Blonder et al. .............. 385/131 |
| 6,271,049 | B1 | * | 8/2001 | Auracher et al. ............. 438/29 |
| 6,722,792 | B2 | * | 4/2004 | Raj et al. ....................... 385/88 |
| 7,250,317 | B2 | * | 7/2007 | Heideman .................... 438/31 |
| 2004/0183078 | A1 | * | 9/2004 | Wang ........................... 257/74 |
| 2006/0110936 | A1 | * | 5/2006 | Hill et al. .................... 438/778 |

* cited by examiner

*Primary Examiner*—Charles D Garber
*Assistant Examiner*—Stanetta D Isaac
(74) *Attorney, Agent, or Firm*—Hogan & Hartson LLP (57) ABSTRACT

A process for manufacturing an integrated device includes the steps of: providing a silicon substrate on which a silicon dioxide structure is arranged and forming a trench having first and second essentially vertical walls relative to the substrate in the structure by means of anisotropic-type etching. A concavity having a sloped wall relative to the substrate is formed by isotropic-type etching which removes the second wall so that the concavity is open to the trench and the sloped wall faces the first wall.

34 Claims, 6 Drawing Sheets

INTEGRATED DEVICE MANUFACTURING PROCESS

RELATED APPLICATION

The present application claims priority of Italian Patent Application No. MI2007A000060 filed Jan. 18, 2007, entitled PROCESSO DI FABBRICAZIONE DI UN DISPOSITIVO INTEGRATO.

FIELD OF THE INVENTION

The present invention relates to integrated devices and, in particular, without limitation, to optical devices.

BACKGROUND OF THE INVENTION

Integrated optical devices are known to be used in communication networks employing optical radiation for information transmission. An example of integrated optical devices is the integrated optical waveguides by means of which optical paths are implemented for processing optical radiation.

Integrated optical waveguides are known to be defined by a core that is arranged on a reference substrate and surrounded by a coating or cladding. The core has a relatively high index of refraction, while the coating has an index of refraction which is lower than that of the core, so that the optical radiation is essentially confined within the optical path as represented by the waveguide core.

The need is also known to develop integrated optical devices in which the optical radiation propagating inside a waveguide can be provided to optoelectronic devices, such as, for example, photodetectors. Furthermore, it is typically required the provision of optical devices suitable to process the optical radiation they receive from other optoelectronic devices, such as, for example, photodiodes or light sources in general.

In order to meet these needs, integrated optical devices are known to be manufactured provided with a reflecting surface (also known as a turning mirror) that is suitable to turn the optical radiation coming from a waveguide integrated in the optical device to optoelectronic devices. A reflecting surface of this type is further suitable to turn the optical radiation coming from an optoelectronic device to the integrated waveguide.

U.S. Pat. No. 5,135,605 proposes a process for manufacturing an integrated optical device composed of a waveguide, the core of which ends in the proximity of a recess which is provided with a sloped wall facing a wall adjacent to the termination of the waveguide. The sloped wall has a slope of about 45° relative to the direction of waveguide propagation, and a turning mirror is obtained thereon in order to turn the optical radiation upwardly. In the above-mentioned patent, it is stated that the wall adjacent to the waveguide termination results to be "almost" vertical relative to the direction of propagation in the waveguide, and this allows minimizing the optical radiation refraction upon passing through the wall in the direction of the waveguide. However, it should be noticed that the Figures annexed to U.S. Pat. No. 5,135,605 highlight that the manufacturing process described therein provides for an etching step by means of which a wall can be obtained that is in any case, differently from what has been stated, sloped relative to the direction of the waveguide, and has even a quite round profile. For these reasons, it is presumable that the residual losses that are due to the optical radiation refraction which, upon passing through such wall, either enters or comes out from the recess along the direction of the waveguide are still found.

SUMMARY OF THE INVENTION

In a preferred embodiment, the present invention relates to a process for manufacturing an integrated device comprising the steps of: providing a silicon substrate on which a silicon dioxide structure is arranged; forming a trench in the structure, by means of an anisotropic-type etching, having first and second walls that are essentially vertical relative to the substrate; forming a concavity in the structure, by means of an isotropic-type etching, having a sloped wall relative to said substrate, said step of forming the concavity by removing the second wall so that the concavity is opened on the trench, and said sloped wall faces said first wall.

BRIEF DESCRIPTION OF THE DRAWINGS

The invention will be better understood by means of the detailed description below, an embodiment thereof being given by way of non-limiting example, with reference to the annexed drawings, in which.

DETAILED DESCRIPTION OF PREFERRED EMBODIMENTS

An example of a process for manufacturing an integrated device will be now described, in particular an integrated device of the optical type, that is generally indicated in the Figures with the reference numeral 100.

The process according to the invention initially provides the formation of a silicon dioxide structure on a reference substrate.

To the purposes of the present description, by "silicon dioxide structure" is meant a multilayer stack comprising a plurality of silicon dioxide layers.

Figure 1:
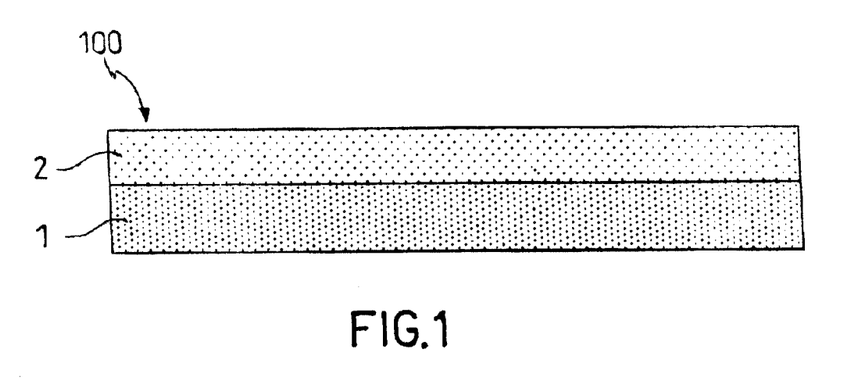
FIGS. 1-10 illustrate sectional views of intermediate steps of the process for manufacturing an integrated device according to an example of the invention.

In greater detail, and with reference to FIG. 1, a first silicon dioxide layer 2 is formed on a silicon substrate 1, usually by deposition.

Figure 2:
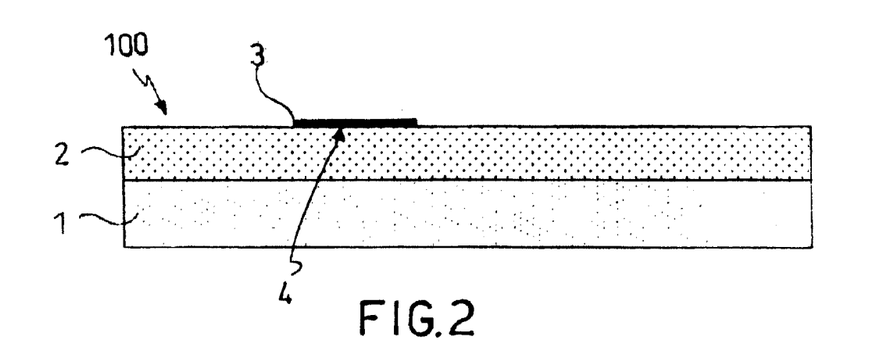

Subsequently, as shown in FIG. 2, one proceeds, through a conventional photolithographic process, to the definition of, on said first silicon dioxide layer 2, a protective member 3, typically in polysilicon, which is suitable to coat a first portion 4 of the first silicon dioxide layer 2 in order to protect the latter, as will be described herein below, against subsequent etching steps that are provided by the process. The protective member 3 is preferably polycrystalline silicon, the deposition of which being carried out by means of a LPCVD (Low Pressure Chemical Vapour Deposition) technique, and which has a thickness which ranges between 0.5-3 microns.

At this point, such process provides a further conventional deposition step of more silicon dioxide so as to form the lower cladding or cladding layer of an integrated optical waveguide with the first silicon dioxide layer 2. The lower cladding layer, that for clarity is again designated with reference numeral 2, is preferably made of silicon dioxide doped with impurities of such a type and concentration as to obtain a prefixed index of refraction $n_{cladding}$. In some cases, the lower cladding layer 2 can also be made of non-doped silicon dioxide. As may be seen in FIG. 3, at the end of this deposition step, the protective member 3 results to be buried inside the lower cladding layer 2 and, in general, it is suitable to protect the portion 4 thereof.

Figure 3:
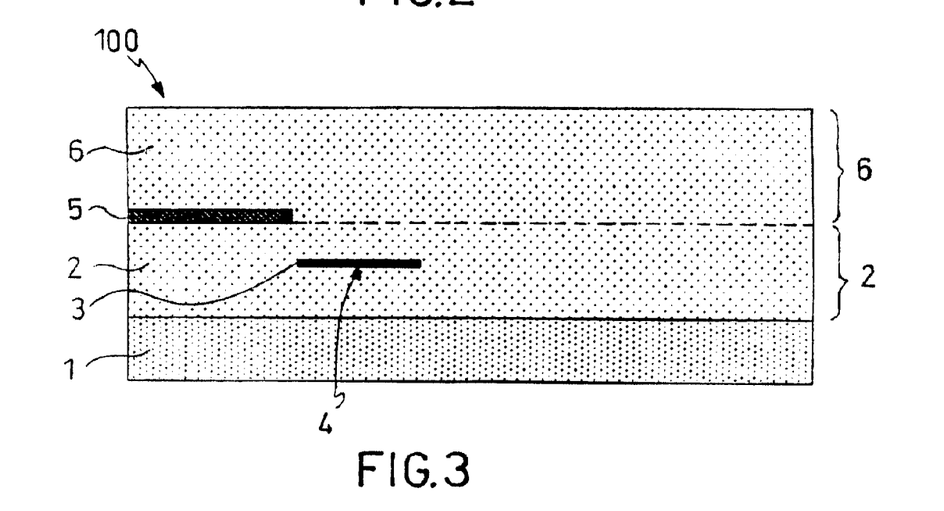

Then, on the lower cladding layer 2 a core layer 5 is deposited, which is doped with a type and a concentration of impurities other than those of the lower cladding layer 2, so that the core index of refraction $n_{core}$ results to be higher than the coating lower index of refraction ($n_{core}$>$n_{cladding}$). It should be noticed that in some applications it is sufficient to have, for example, $n_{core}$ above 1% $n_{cladding}$. The core layer 5 can be preferably doped with germanium or other materials such as, for example, phosphorus, nitrogen, nitrogen oxide, and alumina. The core layer 5 is subjected to a known photolithographic process, following which the tracing of a waveguide core is achieved.

Again, with reference to FIG. 3, the silicon dioxide structure is completed by the deposition of an upper coating or cladding layer 6. This upper cladding layer will cover the core layer 5 from within and from above. The upper cladding layer 6 is preferably made of silicon dioxide doped with a concentration of impurities (for example, boron and phosphor), so as to have the same index of refraction $n_{cladding}$. Under the condition $n_{core}$>$n_{cladding}$, the optical radiation propagates essentially within the optical paths as defined by the cores. It should be noticed that in FIG. 3, a dotted contact line between the lower 2 and the upper 6 cladding layers is shown. In view of the fact that both claddings have essentially identical characteristics (the same index of refraction $n_{cladding}$), said line will be omitted in the following Figures. It should be noticed that, when $n_{core}$ is above 1% $n_{cladding}$, typical values for the thickness of the layers formed by the definition of the integrated optical waveguide are comprised within, for example, the following ranges: lower cladding layer thickness, 13-17 microns; core layer thickness, 34 microns; upper cladding layer thickness, 13-17 microns.

Typical values for the indexes of refraction of core and (lower and upper) coating are for example: $n_{core}$, 1,4650; $n_{cladding}$, 1,4500, respectively.

According to the example under examination, the described process results in the manufacturing of an optical device suitable for the propagation of an optical radiation having a wavelength in the range of 0.8-1.6 microns. In particular, the device which can be obtained by the process of the invention is suitable for applications in the communication field, therefore for wavelengths equal to 1.31 microns, 1.19 microns, or 1.555 microns for example.

As shown in FIG. 3, the silicon dioxide structure arranged on the substrate 1 comprises a first multilayer region comprising the core layer 5 sandwiched between the lower cladding layer 2 and the upper cladding layer 6. The silicon dioxide structure further comprises a second multilayer region, that is brought in a side-by-side relationship to the first multilayer region, comprising the upper cladding layer 6 in contact with the lower cladding layer 2.

Figure 4:
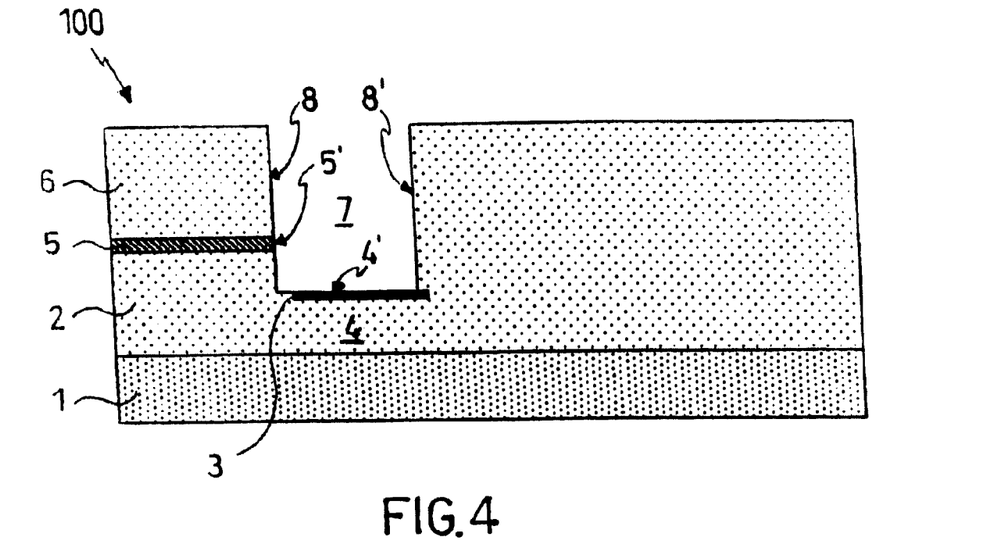

With reference to FIG. 4, the process according to the invention provides a step of forming a trench 7 in the silicon dioxide structure.

In particular, a step is provided of forming, on the upper cladding layer 6, a first masking structure (not shown in Fig.) suitable to leave at least part of the first multilayer region essentially exposed to a subsequent etching step of the silicon dioxide. The first masking structure is defined, by means of conventional techniques, from a photo-sensitive material layer, for example photo-resist. In particular, the first masking structure defines a port having an essentially equal size to those of the protective member 3.

The subsequent step is an anisotropic-type etching, known per se to those of ordinary skill in the art, for example plasma etching with low-density fluorine chemical agents, preferably dry etching, in order to form the trench 7 by removing silicon dioxide from the silicon dioxide structures until reaching the protective member 3.

As is known to those skilled in the art, the etching speed of the anisotropic-type etching is much higher in the direction normal to the surface to be etched than side etching speed. Therefore, as it should be apparent in FIG. 4, the trench 7 has first 8 and second 8' essentially vertical walls relative to the substrate 1 which are mutually joined by an essentially planar surface 4' which is achieved at the protective member 3. In particular, due to the anisotropic-type etching which is employed, it is possible to advantageously achieve a trench having walls with a slope near 900 and a maximum tolerance of 0.5° relative to the substrate 1.

In any case, in other exemplary embodiments, different tolerances are also acceptable such as, for example, ranging between 1-1.5°.

It should be further noticed that the forming step of the trench 7 removes at least part of the first multilayer region so as to define, in the waveguide core 5, a termination 5' arranged on the first wall 8 and, advantageously, facing said trench 7. The termination 5' represents an inlet/outlet port for the optical radiation.

On the structure in FIG. 4 a protective layer 9 (FIG. 5) for example, in poly-silicon, is formed typically by deposition having the function of advantageously protecting the first wall 8 of the trench 7 against a subsequent etching step of the silicon dioxide structure which will be described herein below. The protective layer 9 represents a hard mask, as is known to those skilled in the art. The typical thickness that will be reached by the protective layer 9 during the deposition step ranges between 0.5 and 1.5 microns.

Subsequently, on the structure of FIG. 5, one proceeds to define a second masking structure 10 which defines a port 11 leaving a protective layer 9 region 12 exposed, starting from a layer of photosensitive polymeric material (for example, photoresist).

Figure 5:
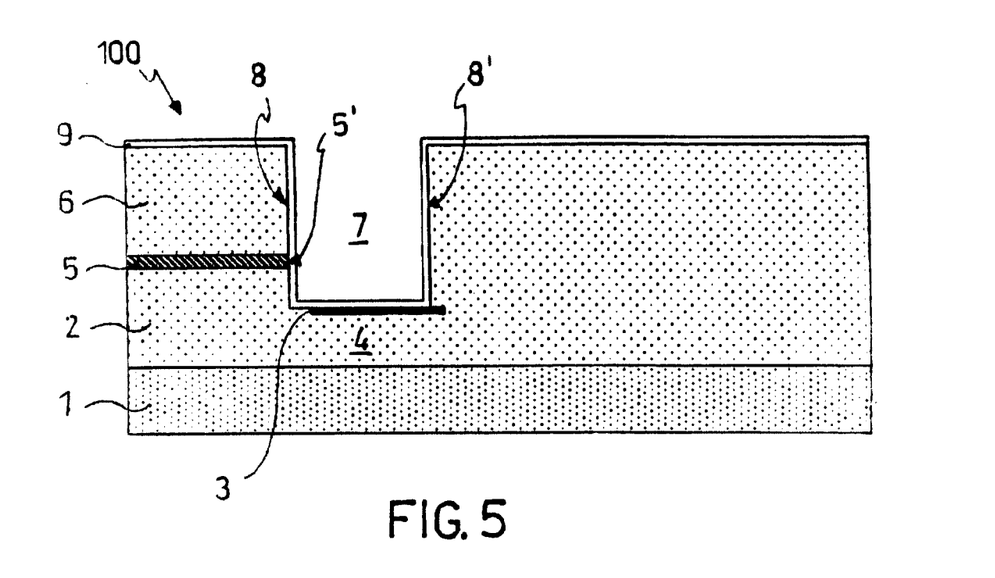
Figure 6:
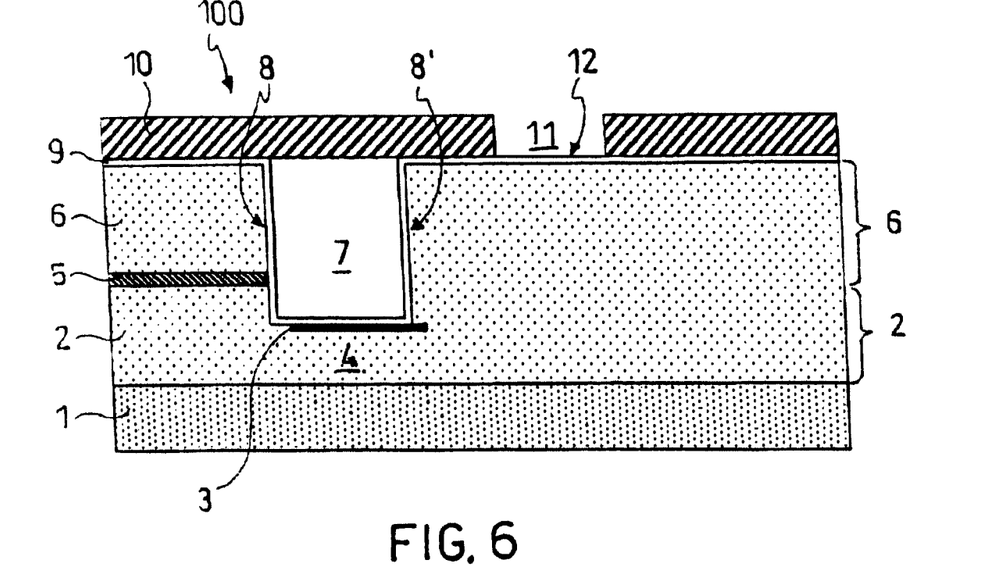

It should be noticed that the polymeric material layer from which the second masking structure 10 is obtained is typically provided by being wrapped on a roll having a thickness in the range between 15-50 microns, and the deposition of the same on the structure of FIG. 5 is carried out by unwrapping the same roll, by means of a lamination technical process, therefore proving to be a very easy and rapid application. In particular, the polymeric material layer has a rigidity such as to be applied to the structure as a layer parallel to the substrate 1, therefore without following the trench 7 profile.

Subsequently, the region 12 is removed to leave a portion of the second multilayer region exposed to the subsequent etching step, by means of a respective port 13. Preferably, the second masking structure 10 is also removed.

At this point, one proceeds to the subsequent etching step as already mentioned above. In particular, the process according to the invention provides isotropic-type etching, for example wet etching, known per se to those of ordinary skill in the art. A wet anisotropic-type etching consists of, for example, etchings in a hydrofluoric acid-based aqueous solution that is identified under the acronym BOE (Buffered Oxide Etch) due to the presence of buffering chemical compounds to maintain the solution pH stable.

Figure 7:
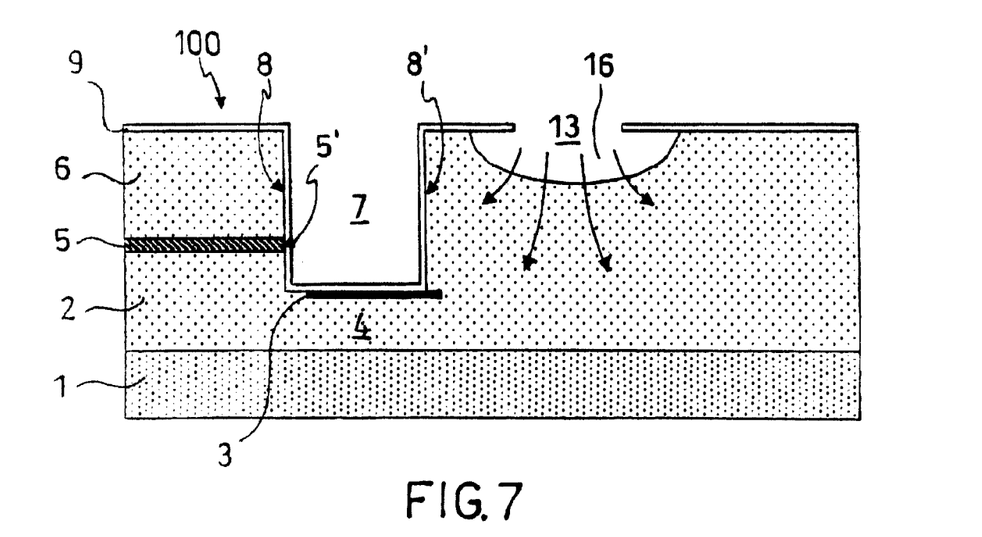
Figure 8:
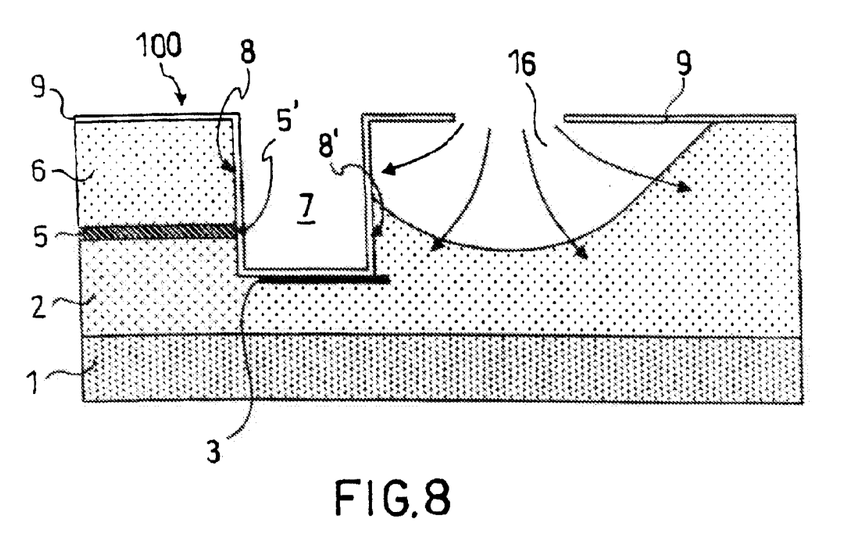
Figure 9:
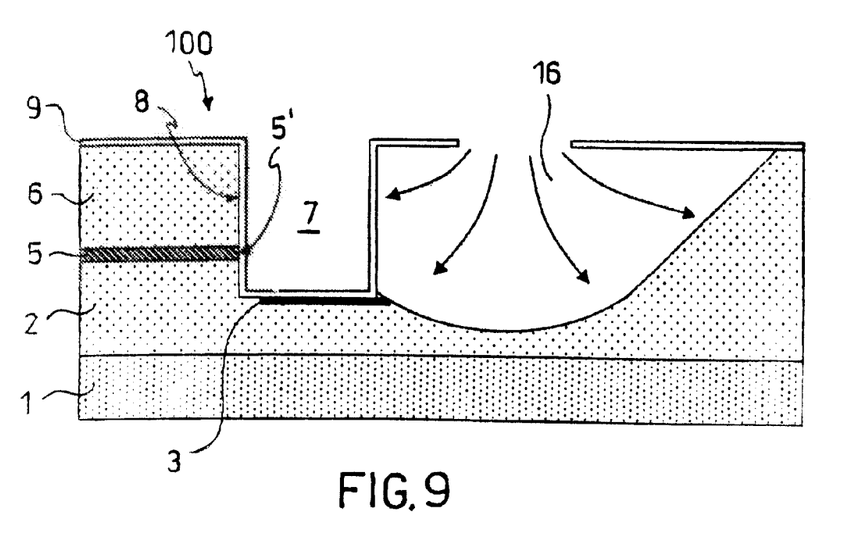

As is known, the etching speed of isotropic-type etching in the direction normal to the surface to be etched is quite equal to the etching speed in the lateral direction. Therefore, as indicated by the arrows in FIGS. 7-9, the second isotropic-type etching partially removes the second multilayer region, in particular beneath the respective port 13 and laterally thereto. It should be noticed that the isotropic-type etching is preferably carried on until when the second wall 8' of the trench 7 is essentially removed. It should be noticed that, towards the trench 7, the isotropic-type etching is locked by the protective layer 9 which advantageously protects, in particular, the first vertical wall 8.

Figure 10:
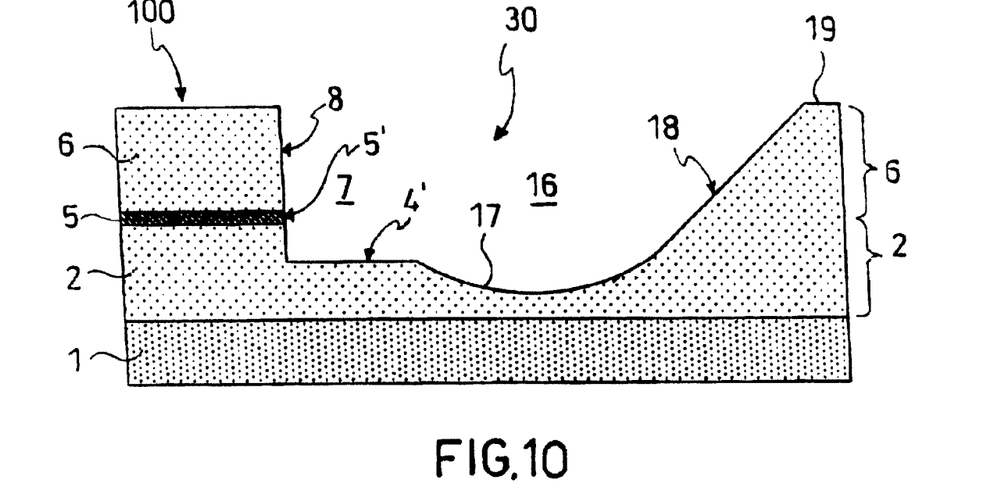

The subsequent process steps are the removal, by means of known techniques, of the protective layer 9 and the protective member 3, respectively, and they allow obtaining the structure of FIG. 10.

In particular, with reference to FIG. 10, it should be noticed that the concavity 16 has a sloped wall 18 relative to the substrate. Furthermore, the removal of the second vertical wall 8' allows such concavity to be opened on the trench 7 by causing such sloped wall 18 to face the first vertical wall 8. The concavity 16 further comprises a curved surface 17 that is joined to the sloped wall 18, which in turn results to be essentially joined to the planar surface 4' of the trench. This allows the trench 7 and the concavity 16 to generally define a recess 30 that is obtained within the silicon dioxide structure, which advantageously results to be delimited by a respective surface (planar surface 4, curved surface 17, sloped wall 18) being essentially free of discontinuities. To the purposes of the present description, by the term "discontinuities" are meant the imperfections (for example steps, relief or grooves) which are formed on a silicon dioxide structure during a process for manufacturing an integrated device due to the sequence of definition steps of masking structures and etching steps.

Further, the integrated optical waveguide inlet/outlet port 5' that is arranged on the first wall 8 advantageously results to face the recess 30 and, in particular, the sloped wall 18. The sloped wall 18 ends on a peripheral portion 19 of the second multilayer region upper surface.

The recess 30 obtained by the exemplary process described according to the invention has the first wall 8, with which the core 5 ends, essentially vertical relative to the substrate 1 and, in particular, to the propagation direction in the integrated optical waveguide. This aspect advantageously allows sensibly reducing the optical radiation losses due to the refraction which the same radiation undergoes, upon leaving the inlet/outlet port 5', passing through the first wall 8 in a direction of propagation orthogonal to the same wall when it enters or comes out from the recess 30. As is known, in fact, the substantial orthogonality between propagation direction of an optical radiation and a respective wall to be passed through (for example, a recess) represents a requisite suitable to ensure minimum optical radiation refraction.

Figure 11:
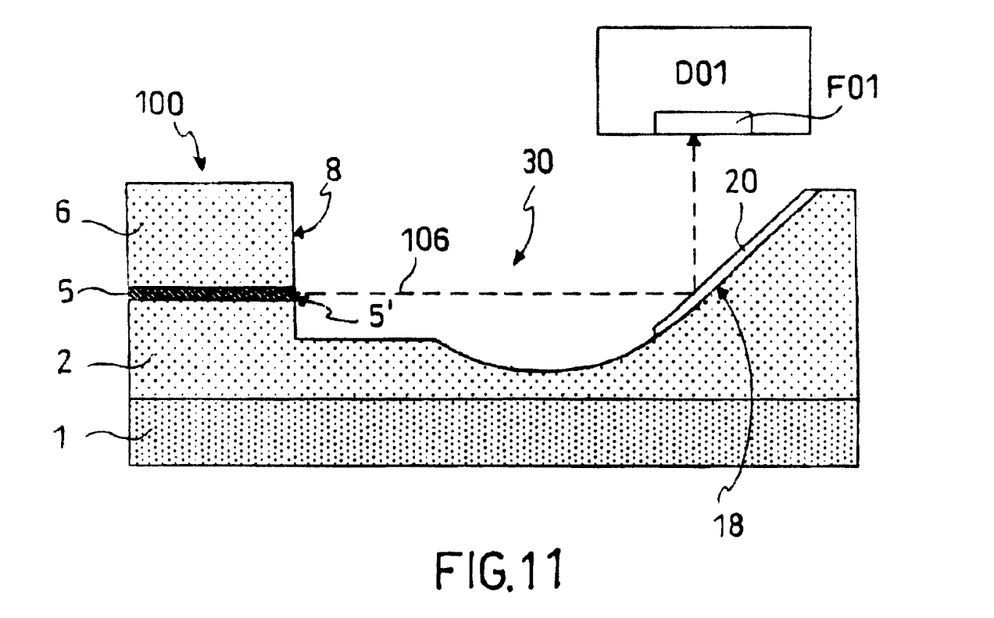
FIG. 11 schematically illustrate an exemplary integrated device that is obtained starting from the structure of FIG. 10.

With reference to FIG. 11, the process according to the invention further provides a step of depositing a reflecting layer 20 on the sloped wall 18. It should be noticed that conventional masking and etching techniques are employed to define the reflecting layer. The reflecting layer 20 preferably has such characteristics and properties as to act as a turning mirror for the optical radiation, from a first propagation direction to a second propagation direction. In the following of the present description, the reflecting layer 20 will be indicated with the term "mirror". In FIG. 11, an exemplary optical radiation path (dotted line, marked by the reference numeral 106) is illustrated. It should be noticed that the direction of propagation of the first optical radiation is parallel to the substrate 1, since this is an optical radiation which is confined inside the waveguide core 5 proceeding in the air before meeting the mirror 20. It should be further noticed that the sloped wall 18, in the example shown in the figures, has a slope of about 45° relative to the substrate 1. It results, as it is known to those skilled in optical geometry, that the second direction of propagation of the optical radiation results to be essentially vertical to the substrate 1.

The exemplary mirror in FIG. 11 can be employed to convey the optical radiation coming from the waveguide towards an optoelectronic device DO1 (schematically illustrated in FIG. 11), such as, for example, a photodetector, that is operatively associable to the integrated device and typically arranged thereabove so as to have a respective optical window FO1 facing the mirror 20.

Alternatively, or in association with such use, the turning mirror 20 can also be used to convey an optical radiation coming from a further optoelectronic device, for example a photodiode, towards the waveguide core through the recess 30.

Figure 12:
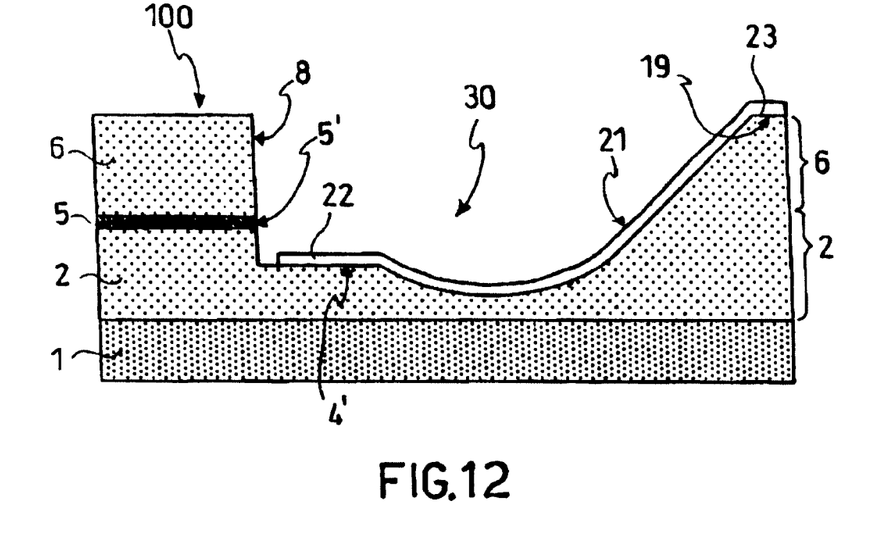
FIG. 12 schematically illustrates the structure of FIG. 10 on which a metallization example is obtained.

Now, with reference to FIG. 12, within the recess 30 and, in particular, on the respective surface free from discontinuities, a metallization 21 can be formed having a first end 22 arranged on said planar surface 4', and a second end 23, opposite the first end, arranged in contact with the silicon dioxide structure peripheral portion 19. The metallization 21 is made of an electrically conductive material, preferably a metallic material, for example and, alternating one to the other, titanium-gold, chromium-gold, titanium-platinum-gold, chromium-nickel-gold.

It should be noticed that the metallization 21 advantageously acts as an electrical contact between a reference plane arranged inside the recess (planar surface 4') and an upper plane which is external to the recess (peripheral portion 19). Furthermore, still advantageously, the surface free of discontinuities allows forming the metallization 21 without necessarily having a high thickness which, as it is known, is typically required to avoid the occurrence of interruptions in a metallization due to apparent discontinuities which are present on the surface to be coated. Thereby, the metallization 21 ensures good electrical conductibility between the first 22 and second 23 ends that are arranged within and outside the recess, respectively.

Figure 13:
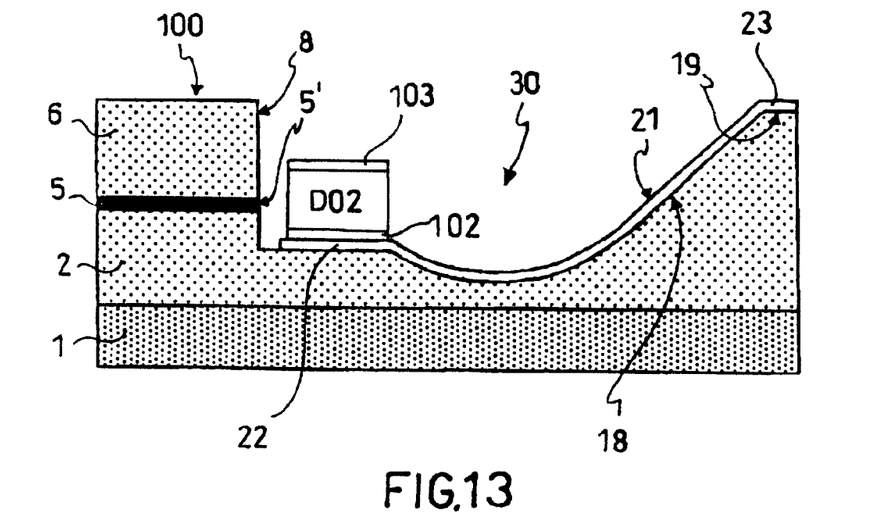
FIG. 13 schematically illustrates a further example of an integrated device which is obtained starting from the structure of FIG. 12, and includes a FIG. 13A is which a side view of device DO2 thereof.
Figure 13A:
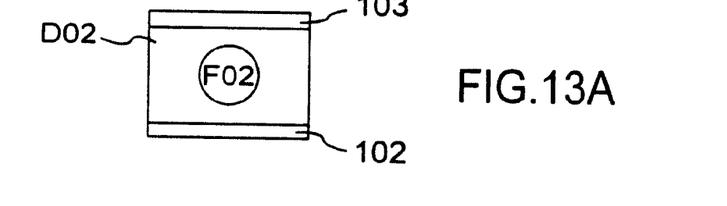

With reference to FIG. 13, an application of the structure shown in FIG. 12 is now described. The recess 30 is suitable to house a further opto-electronic device DO2 (also schematically illustrated in the Figure) having a respective optical window FO2 (see detail FIG. 13A), and respective first 102 and second 103 electrical contacts to receive a supply signal.

In particular, the further optoelectronic device DO2 can be preferably oriented so that the respective optical window FO2 results to be facing the waveguide inlet/outlet port 5'. The further optoelectronic device can be a laser source, for example a solid state laser, suitable to send an optical radiation into the core 5.

As shown in FIG. 13, the first electrical contact 102, or bottom contact, of the optoelectronic device DO2 contacts the first end 22 of the metallization 21, therefore being arranged inside the recess 30 in a point that is hardly accessible from the outside. The second electrical contact 103, or top contact, of the optoelectronic device DO2, is preferably arranged at the opposite side relative to the first contact 102. It should be understood from the Figure that the second electrical contact 103 results to be easily accessible, since it faces the integrated device outer part.

Advantageously, a supply signal of the optoelectronic device DO2 is applicable to the second end 23 of the metallization 21 and, since said metallization acts as an electrical conductor, it results to be equally applied also to the first end 22, i.e. to the first electrical contact 102. This aspect results to be very advantageous, since it is possible to provide an electrical signal to a contact that is hardly reachable from the outside (first contact 102) by means of the metallization 21, by applying said signal in a point that is more easily reachable (second end 23), for example, with optional electrical signal supplying apparatuses (not shown in the Figures).

As regards the optoelectronic device DO2 orientation, it is required that the respective optical window FO2 faces the waveguide inlet/outlet port 5' so that the direction of propagation of an optical radiation coming from the waveguide essentially hits the optical window FO2a.

Furthermore, the essentially vertical wall 8 allows housing the optoelectronic device as near to the waveguide inlet/outlet port 5' as possible, thus advantageously allowing reducing the optical radiation optical path in the air, inside which, as is known, the optical radiation undergoes a dispersion. In particular, the need is felt to arrange the optoelectronic device so that the dispersed optical radiation is essentially residual. In fact, it is known that the optical radiation, when it passes from the guide core into the air, is subjected to an abrupt index of refraction change, which involves an enlargement of the latter, which tends to disperse in directions which are different from the propagation direction in the guide.

As it may be seen, the object of the invention is fully achieved, since the described process allows defining a recess having, relative to the substrate, a second sloped wall facing a first essentially vertical wall on which an integrated optical waveguide ends. As stated above, the first wall allows minimizing the refraction losses of the optical radiation passing from the waveguide to the recess. It should be further noticed that the protective structure 9 that is employed between the first and second etchings allows protecting the first wall against the second isotropic-type etching. This aspect results to be very advantageous in order to preserve the first wall, the essentially vertical profile of which had been previously defined by the first anisotropic-type etching. Therefore, the manufacturing process provides a high level of control and precision of slope of the first wall.

The invention claimed is:

1. A process for manufacturing an integrated device, comprising:
   providing a silicon substrate on which a silicon dioxide structure is arranged;
   forming a trench having first and second essentially vertical walls relative to the substrate in the structure by means of anisotropic-type etching;
   forming in the structure a concavity having a sloped wall relative to said substrate by means of isotropic-type etching which removes the second wall so that the concavity opens on the trench and said sloped wall faces said first wall; and
   forming, inside a lower cladding layer of the silicon substrate, a protective member in order to protect a first portion of said lower cladding layer during said anisotropic-type etching.

2. The process according to claim 1, wherein forming the concavity comprises forming a protective layer-suitable to protect at least said first wall against said isotropic-type etching.

3. The process according to claim 1, wherein the silicon dioxide structure comprises a first multilayer region comprising a waveguide including a core layer sandwiched between the lower cladding layer and an upper cladding layer.

4. The process according to claim 3, wherein the silicon dioxide structure further comprises a second multilayer region, which is arranged in a side-by-side relationship relative to the first multilayer region, comprising the upper cladding layer in contact with the lower cladding layer.

5. The process according to claim 4, wherein forming the trench removes at least a part of the first multilayer region so as to define, in the waveguide core, an inlet/outlet port on said first wall of the trench, said inlet/outlet port facing said trench.

6. The process according to claim 5, wherein forming a concavity partially removes said second multilayer region.

7. The process according to claim 5, wherein forming the trench comprises forming a first masking structure which leaves said at least one part of the first multilayer region essentially exposed to said anisotropic-type etching.

8. The process according to claim 5, wherein forming a concavity comprises forming a second masking structure on the silicon dioxide structure, which leaves a second portion of the second multilayer region exposed to said second anisotropic etching.

9. The process according to claim 1, wherein the concavity comprises a planar surface suitable to mutually join said first and second walls and further a curved surface, and wherein forming the concavity includes removing the second wall so that the curved region is essentially joined to said planar surface so as to define a recess defined by a respective surface essentially free from discontinuities.

10. The process according to claim 1 further comprising forming a reflecting layer on said sloped wall.

11. The process according to claim 10, wherein the waveguide core is suitable for propagation of an electromagnetic radiation therein, said reflecting layer being a turning mirror suitable to turn said electromagnetic radiation from a first propagation direction to a second propagation direction.

12. The process according to claim 11, wherein said first propagation direction is essentially parallel to the substrate.

13. The process according to claim 12, wherein said second propagation direction is essentially vertical to the substrate.

14. The process according to claim 13, wherein said reflecting layer is suitable to turn said electromagnetic radiation from a first propagation direction to a second propagation direction, and allows for conveying the electromagnetic radiation coming from the waveguide to an outer optoelectronic device operatively associable with said integrated device.

15. The process according to claim 14, wherein said reflecting layer further allows for conveying electromagnetic radiation coming from said outer optoelectronic device to the waveguide.

16. The process according to claim 9, further comprising forming a metallization on said surface essentially free from discontinuities having a first end arranged on said planar surface and a second end, opposite said first end, which is arranged proximate to an upper part, opposite the substrate, of the silicon dioxide structure.

17. The process according to claim 16, wherein said recess is suitable to house a further optoelectronic device having a respective optical window and at least one contact suitable to receive a respective supply signal, said at least one contact being arranged on said first end of the metallization.

18. The process according to claim 17, wherein said further optoelectronic device can be oriented so that the respective optical window essentially faces the inlet/outlet port of the waveguide.

19. The process according to claim 16, wherein said further optoelectronic device is a laser source.

20. The process according to claim 17, wherein said further electronic device is a photodetector.

21. The process according to claim 1, wherein said protective member is made of poly-silicon.

22. The process according to claim 8, wherein said first and second masking structure are made of photosensitive material.

23. The process according to claim 2, wherein the protective structure is made of poly-silicon.

24. The process according to claim 1 wherein said sloped wall has a slope of about 45°.

25. The process according to claim 14, wherein said optoelectronic device is a photodetector.

26. The process according to claim 19, wherein said laser source is a solid state laser.

27. A process for manufacturing an integrated device, comprising:

providing a silicon substrate on which a silicon dioxide structure is arranged;

firstly forming a trench having first and second essentially vertical walls relative to the substrate in the structure by anisotropic-type etching; and once the trench has been completely formed, secondly forming in the structure a concavity having a sloped wall relative to said substrate by means of isotropic-type etching which removes the second wall so that the concavity opens on the trench and said sloped wall faces said first wall.

28. The process according to claim 27, wherein forming the concavity comprises forming a protective layer-suitable to protect at least said first wall during said isotropic-type etching.

29. The process according to claim 27, wherein the silicon dioxide structure comprises a first multilayer region comprising a waveguide including a core layer sandwiched between a lower cladding layer and an upper cladding layer.

30. The process according to claim 29, wherein the silicon dioxide structure further comprises a second multilayer region, which is arranged in a side-by-side relationship relative to the first multilayer region, comprising the upper cladding layer in contact with the lower cladding layer.

31. The process according to claim 30, wherein forming the trench removes at least a part of the first multilayer region so as to define, in the waveguide core, an inlet/outlet port on said first wall of the trench, said inlet/outlet port facing said trench.

32. The process according to claim 30, wherein forming a concavity partially removes said second multilayer region.

33. The process according to claim 29, wherein providing the substrate comprises forming a protective member in order to protect a first portion of said lower cladding layer against said anisotropic-type etching.

34. The process according to claim 33, wherein said protective member comprises poly-silicon.

* * * * *